(12) United States Patent
Kazenas

(10) Patent No.: US 8,401,879 B1
(45) Date of Patent: Mar. 19, 2013

(54) UMBRELLA TRAVEL INSURANCE

(75) Inventor: Joseph Kazenas, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 111 days.

(21) Appl. No.: 12/969,300

(22) Filed: Dec. 15, 2010

(51) Int. Cl.
G06Q 40/00 (2006.01)
(52) U.S. Cl. ............................................. 705/4
(58) Field of Classification Search ............ 705/4
See application file for complete search history.

(56) References Cited

U.S. PATENT DOCUMENTS

| | | | |
|---|---|---|---|
| 6,959,298 B1 * | 10/2005 | Silverbrook et al. ............ | 1/1 |
| 7,689,504 B2 * | 3/2010 | Warren et al. ............ | 705/38 |
| 8,046,244 B1 * | 10/2011 | Yager et al. ............ | 705/4 |
| 2002/0038281 A1 * | 3/2002 | Lohmann et al. ............ | 705/37 |
| 2003/0004760 A1 * | 1/2003 | Schiff et al. ............ | 705/5 |
| 2004/0148201 A1 * | 7/2004 | Smith et al. ............ | 705/4 |
| 2006/0004602 A1 * | 1/2006 | Silverbrook et al. ............ | 705/1 |
| 2007/0156462 A1 * | 7/2007 | Kazanchian et al. ............ | 705/4 |
| 2007/0260495 A1 * | 11/2007 | Mace et al. ............ | 705/5 |
| 2008/0177583 A1 * | 7/2008 | Colavito et al. ............ | 705/4 |
| 2009/0030734 A1 * | 1/2009 | Peterie ............ | 705/4 |
| 2010/0023355 A1 * | 1/2010 | Sagalow et al. ............ | 705/4 |
| 2010/0241561 A1 * | 9/2010 | Borowski et al. ............ | 705/40 |

* cited by examiner

Primary Examiner — Lindsay M. Maguire
(74) Attorney, Agent, or Firm — Kilpatrick Townsend & Stockton, LLP

(57) ABSTRACT

Umbrella travel insurance that accounts for coverage provided to the user through other insurance policies. A request from the existing customer is received for a travel insurance policy. It is determined whether the customer has an existing insurance policy issued by an insurance company. The existing insurance policy issued by the insurance company held by the existing customer is analyzed. Coverage of the travel insurance policy using coverage of the existing insurance policy is modified to create a modified travel insurance policy. Overlap of the existing insurance policy and coverage of the modified travel insurance policy is at least reduced.

20 Claims, 7 Drawing Sheets

300

| Umbrella Travel Insurance Policy Quote | | | |
|---|---|---|---|
| 305 — Dates: | 4/27/11 - 6/13/11 | | |
| 310 — Countries: | Mexico, Argentina, Chile, Peru | | |
| 315 — Coverages | Deductible | Coverage in other policy? | Savings |
| 320 — Theft of Personal Property | $500 | Yes (Homeowners) | $27 |
| 325 — Legal Fees | $1,000 | No | |
| 330 — Court Fees | $1,000 | No | |
| 335 — Injury while traveling | $250 | No | |
| 340 — Sickness while traveling | $250 | No | |
| 345 — Evacuation | None | No | |
| 350 — Bedside visitor | None | No | |
| 355 — Vehicular damage | | Yes (Auto) | $12 |
| 360 — Vehicle theft | | Yes (Auto) | $7 |
| 365 — Vehicle collision | | Yes (Auto) | $31 |
| 370 — Kidnapping | | No | |
| 375 — Theft of items acquired while traveling | | No | |
| 380 — Loss of items acquired while traveling | $100 | No | |
| 382 — Items brought traveling (camera) | $200 | Yes (VPP) | $9 |
| 385 — Cost without Discount | $257 | | |
| 390 — Your Discount | $86 | | |
| 395 — Final Cost | $171 | | |

FIG. 3

UMBRELLA TRAVEL INSURANCE

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to insurance systems. More specifically, the present invention relates to methods and systems for providing travel insurance to a customer in light of existing coverage provided to the customer through other insurance policies. Merely by way of example, the invention has been applied to a method of providing travel insurance. The methods and techniques can be applied to a variety of other forms of insurance.

According to an embodiment of the present invention, a method for providing travel insurance to an existing customer is provided. The method includes providing a computer system and receiving, by the computer system, a request from the existing customer for a travel insurance policy having a set of initial coverage areas. The computer system is operated on behalf of an insurance company. The method also includes determining, by the computer system, that the existing customer has an existing insurance policy issued by the insurance company, analyzing, by the computer system, the existing insurance policy to determine a set of existing coverage areas associated with the existing insurance policy, and determining, by the computer system, that an overlap is present between the set of initial coverage areas associated with the travel insurance policy and the set of existing coverage areas associated with the existing insurance policy. The method further includes modifying, by the computer system, one or more of the initial coverage areas in the set of initial coverage areas associated with the travel insurance policy to create a modified travel insurance policy and providing, by the computer system, information associated with the modified travel insurance policy to the existing customer.

According to another embodiment of the present invention, a non-transitory computer-readable storage medium comprising a plurality of computer-readable instructions tangibly embodied on the computer-readable storage medium, which, when executed by a data processor, provide travel insurance to an existing customer is provided. The plurality of instructions include instructions that cause the data processor to receive a request from the existing customer for a travel insurance policy having a set of initial coverage areas. The computer system is operated on behalf of an insurance company. The instructions include instructions that cause the data processor to determine that the existing customer has an existing insurance policy issued by the insurance company, instructions that cause the data processor to analyze the existing insurance policy to determine a set of existing coverage areas associated with the existing insurance policy, and instructions that cause the data processor to determine that an overlap is present between the set of initial coverage areas associated with the travel insurance policy and the set of existing coverage areas associated with the existing insurance policy. The plurality of instructions also include instructions that cause the data processor to modify one or more of the initial coverage areas in the set of initial coverage areas associated with the travel insurance policy to create a modified travel insurance policy, and instructions that cause the data processor to provide information associated with the modified travel insurance policy to the existing customer.

According to another embodiment of the present invention, a system for providing travel insurance to an existing customer having homeowners insurance held by an insurance company is provided. The system includes an input module for receiving a request from the existing customer for a travel insurance policy having a set of initial coverage areas. The computer system is operated on behalf of an insurance company. The system also includes a processing module for determining that the existing customer has an existing insurance policy issued by the insurance company, an analysis module for analyzing the existing insurance policy to determine a set of existing coverage areas associated with the existing insurance policy, and an analysis module for determining that an overlap is present between the set of initial coverage areas associated with the travel insurance policy and the set of existing coverage areas associated with the existing insurance policy. The system also includes a customizer module for modifying one or more of the initial coverage areas in the set of initial coverage areas associated with the travel insurance policy to create a modified travel insurance policy, and an output module for providing information associated with the modified travel insurance policy to the existing customer.

Numerous benefits are achieved by way of the present invention over conventional techniques. For example, embodiments of the present invention provide a customer with travel insurance without forcing the customer to pay for coverage areas that the customer already has through preexisting insurance policies. Additionally, embodiments of the present invention allow a customer to customize a travel insurance policy to suit the customer's specific needs.

These and other embodiments of the invention along with many of its advantages and features are described in more detail in conjunction with the text below and attached figures.

BRIEF DESCRIPTION OF THE DRAWINGS

FIG. 3 illustrates an embodiment of an umbrella travel insurance quote according to an embodiment of the present invention.

DETAILED DESCRIPTION OF SPECIFIC EMBODIMENTS

Figure 1:
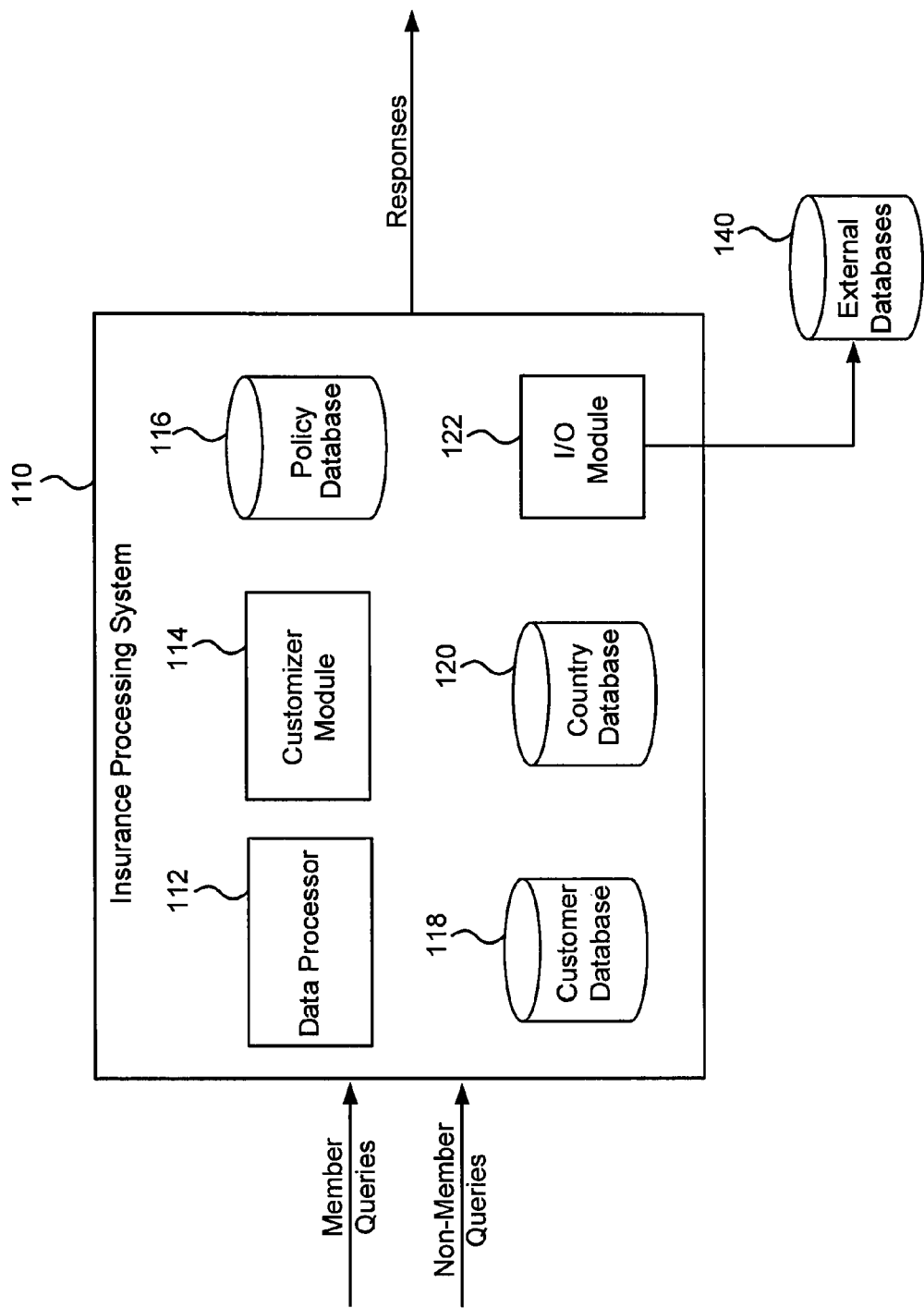
FIG. 1 illustrates a high level block diagram of an insurance processing system according to an embodiment of the present invention.

Embodiments of the present invention relate to technologies to facilitate homeowners and/or renters in finding, acquiring, insuring, and/or maintaining real property. Technologies related to embodiments of the present invention support a homeowner/renter, for example, a member of the present assignee, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., the present assignee) utilize the methods and systems described herein to manage their real property interests and interact with other community members to enable new concepts related to homes and other real property.

Persons traveling internationally and within the country may opt to purchase travel insurance to limit their liability for occurrences during travel. For instance, a person may opt to purchase a travel insurance policy that will provide health coverage while the person is traveling. The travel insurance policy may also provide protection for disruption of the person's travel itinerary, such as unplanned hotel stays due to flight cancellations.

Typically, travel insurance is purchased as a standalone policy. Further, the travel insurance may be purchased from an insurance company that does not handle other insurance policies for the person. While a person may have existing insurance policies, such as renter's insurance, homeowner's insurance, automotive insurance, valuable personal property insurance, and health insurance (to name only a few examples), these insurance policies may not be taken into consideration when the travel insurance policy is issued by the insurance company.

In some embodiments, an umbrella travel insurance policy that is issued by an insurance company to a customer is described. Such an umbrella travel insurance policy may reflect various coverage areas the customer also has in other insurance policies. These other insurance policies may be issued to the customer by the same insurance company or by one or more third party insurance companies. By reducing the coverage provided to the customer through the umbrella travel insurance policy, the customer may be able to receive travel insurance at a reduced cost. This reduced cost may be realized by reducing or minimizing overlap in coverage areas provided by the travel insurance and the customer's other insurance policies.

Further, an umbrella travel insurance policy may allow the customer considerable options in selecting various coverage for occurrences during his travels. For instance, the customer may opt for coverage of theft of personal property, treatment for injuries sustained while traveling, legal and court fees, liability costs, theft and/or loss of items acquired while traveling.

FIG. 1 illustrates a high level block diagram of an insurance processing system 110. As illustrated in FIG. 1, insurance processing system 110 may receive various queries from members and non-members. Members may represent users that have a preexisting relationship with an insurance company operating insurance processing system 110. For example, such a preexisting relationship may be an insurance policy issued by the insurance company held by the member. Further, another preexisting relationship may be a membership held by the member in an organization that operates the insurance company and insurance processing system 110. Similarly, queries may be received by insurance processing system 110 from non-members. Non-members may represent users that do not have a preexisting relationship with the insurance company operating insurance processing system 110. Collectively, members and non-members may be referred to as users or customers. Queries received from users may be requests for price quotes for insurance policies, requests for the issuance of one or more insurance policies, claim requests, and the like.

The insurance processing system 110 may include a country database 120, policy database 116, and a customer database 118. Customer database 118 may contain information regarding users who are currently customers of the insurance company operating insurance processing system 110. Customer database 118 may contain information about customers, such as customers' biographical information. Policy database 116 may contain information regarding the policies held by customers. Policy database 116 may contain information regarding the coverage, dates, claims, and/or payments associated with various insurance policies issued by the insurance company associated with insurance processing system 110. Country database 120 may be used to store information related to coverage that is available in particular countries for umbrella travel insurance policies. For example, the insurance company may not offer certain types of coverage (or umbrella travel insurance policies at all) in certain high risk countries. Country database 120 may also be used to store cost differentials between countries. In some countries, the cost of a type of coverage may vary depending on the risk identified to the insurance company. For example, vehicle insurance may be less costly in Finland than Morocco.

Insurance processing systems may include a data processor 112. Data processor 112 may be one or more computer processors. Data processor 112 may be part of a computer system that interacts with various components of insurance processing system 110. Data processor 112 may be able to access policy database 116, customer database 118, and country database 120.

Insurance processing system 110 may also include an I/O module 122. I/O module 122 may allow for communication with various external databases 140. External databases 140 may be operated by third-party entities, such as third party insurance companies, the government, etc. It should be understood that while a connection is shown from I/O module 122 to external databases 140, communication may occur via one or more networks.

Insurance processing system 110 may also include a customizer module 114. Customizer module 114 may alter the coverage of an umbrella travel insurance policy based on queries from a user and information gathered from policy database 116, customer database 118, and/or country database 120. For example, customizer module 114 may receive information from a user indicating the dates and countries his travel plans encompass. Customizer module 114 may access customer database 118 to determine if the user is already a customer, and, if so, may analyze what coverage the user already has by accessing policy database 116. The customizer may also access one or more external databases 140 via I/O module 122 to determine additional insurance coverage (through third party insurance companies) of the user and/or to gather additional information on the user. Based on the travel itinerary specified by the user, the customizer may access country database 120 to determine what coverage is available for the user's itinerary and at what cost. Customizer module 114 may interact with data processor 112 to complete various processing.

It should be understood that the various databases and modules of insurance processing system 110 may be combined or divided into fewer or more databases and modules. Insurance processing system 110 is an exemplary embodiment only and is not intended to limit the configuration or components of other embodiments of insurance processing systems.

Figure 2:
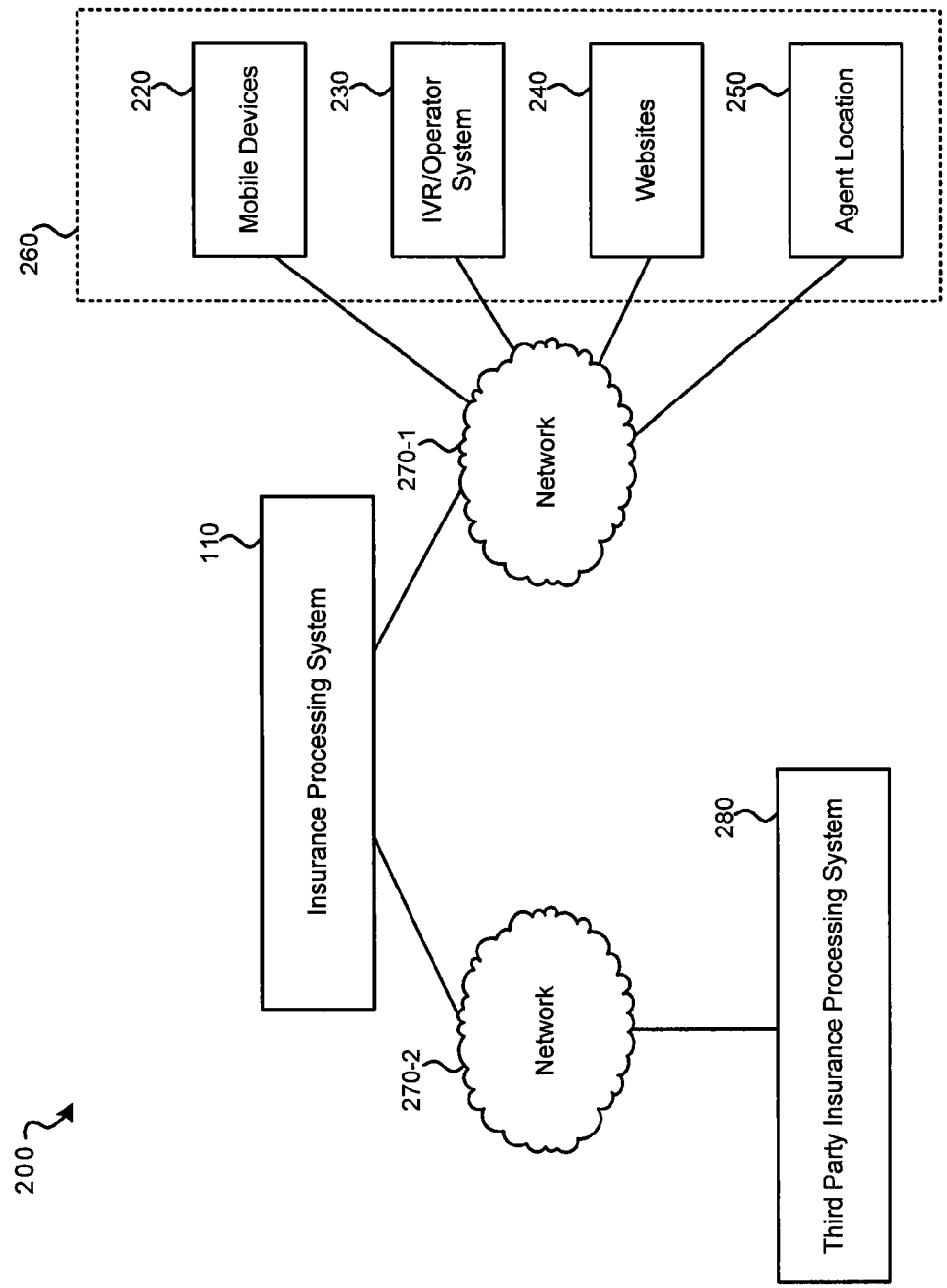
FIG. 2 illustrates a high level block diagram of an insurance processing system connected with external systems according to an embodiment of the present invention.

Insurance processing system 110 of FIG. 1 may interact with various other systems and devices to interact with users and third party systems. FIG. 2 illustrates a high level diagram of an embodiment 200 of an insurance processing system connected with external systems. Insurance processing system 110 of FIG. 2 may represent the insurance processing system 110 of FIG. 1. Insurance processing system 110 may interact with users via various systems and devices, including: mobile devices 220, Interactive voice response (IVR)/operator system 230, website 240, and/or agent locations 250 (collectively referred to as interfaces 260).

Each of interfaces 260 may allow users to interact with insurance processing system 110. Mobile devices 220 may represent various electronic devices that allow a user to communicate with insurance processing system via network 270. Mobile devices 220 may include smart phones, which may run one or more applications specifically implemented to communicate with insurance processing systems 110 or may use an internet browser to do so. IVR/operator system 230 may permit a user to communicate with insurance processing systems 110 via a human operator (likely located in a call center) or an automated system that responds to input (such as voice commands or touch tone input via a phone keypad). Users may also use one or more websites 240 to communicate with insurance processing systems 110. Websites 240 may be operated directly by the insurance company operating insurance processing system 110 or may be operated by a third-party vendor of the insurance company's policies. Users may also communicate with insurance processing system 110 via one or more agent locations 250. Agent locations may represent physical locations where a user may interact with the insurance processing system 110 such as through a human agent of the insurance company or an electronic terminal.

Interfaces 260 are illustrated as communicating with insurance processing system 110 via network 270-1. It should be understood that the illustrated networks are provided as examples and additional networks are not illustrated for purposes of clarity. Network 270-1 may represent one or more networks. For example, mobile devices 220 may communicate with insurance processing systems 110 via a wireless carrier's network in conjunction with the Internet. Agent locations 250 may communicate with insurance processing system 110 via a public network, such as the Internet, or a private network, such as a corporate wide area network.

Insurance processing systems 110 may communicate with one or more third party insurance processing systems. Communication with third party insurance processing system 280 may occur via network 270-2, which may represent the same or different network as network 270-1. Third party insurance processing system 280 may provide insurance processing system 110 with information regarding insurance policies held by users.

Insurance processing system 110 of FIG. 2 or insurance processing system 110 of FIG. 1 may be used to generate umbrella travel insurance quotes for users. FIG. 3 illustrates an embodiment of an umbrella travel insurance quote 300. Umbrella travel insurance quote 300 of FIG. 3 is presented in the form of a table; however, it should be understood that umbrella travel insurance quote 300 is an exemplary umbrella travel insurance quote only and other embodiments are possible.

Line 305 lists a range of dates. These dates may be specified by a user as the dates during which the user is traveling. These dates may be used by the insurance processing system to determine the cost of the umbrella travel insurance policy for the user. Line 310 may identify the countries to which the user is traveling. In umbrella travel insurance quote 300, a list of countries that will be visited over the user's travel dates listed in line 305 is provided. Other embodiments require that the user identify the specific dates that travel will occur in each country. Some embodiments require only that the user specify the region that the user is traveling in, such as "western Europe." Based on the dates and countries supplied by the user, a certain level and/or type of coverage may be recommended to the user. Umbrella travel insurance quote 300 may include coverage areas that are recommended to the user based on the countries and dates selected. For example, the longer a user is traveling, the more coverage areas may be recommended. Or, if a country is more dangerous than average, a higher maximum coverage may be recommended to the user.

Line 315 lists headers for the information that will be provided to the customer via the umbrella travel insurance policy. Line 315 lists various headers: "coverage," "deductible," "Coverage in other policy?," and "savings." "Coverage" refers to the category of insurance coverage provided by the umbrella travel insurance policy. "Deductible" refers to the amount of money the user must pay before the umbrella travel insurance policy pays out for a specific type of coverage; "Coverage in other policy" reflects whether the umbrella travel insurance policy has factored in that the user has at least some amount of coverage through some other insurance policy, and whether the other insurance policy was issued by the insurance company or a third party insurance company. "Savings" refers to an amount of money the user may be saving due to the fact that some other insurance policy of the user is being taken into consideration.

Line 320 may represent a standard coverage that is provided in all umbrella travel insurance policies, a coverage that is provided by default, or a user-added coverage. A default coverage may refer to a coverage that is provided on umbrella travel insurance policies, but that a user may request be removed. A user-added coverage may refer to a coverage that is not provided by default and a user must specify that the user wants included in the umbrella travel insurance policy. Each of lines 320 through 385 may represent either a standard coverage, a default coverage, or a user-added coverage. Line 320 provides coverage for the theft of personal property while traveling in the countries indicated on line 310 during the time span indicated on line 305. The deductible is listed as $500. This amount may or may not be changed by the user. For example, if a user desires a lower deductible, the cost of the umbrella travel insurance policy may increase. If the user desires a higher deductible, the cost of the umbrella travel insurance policy may decrease. In embodiment 300, the user has coverage regarding the theft of personal property in his homeowners policy. This may have been determined by the insurance processing system because the user holds the homeowners insurance policy with the same insurance company the user is applying for the umbrella travel insurance policy through. Since at least some coverage is provided for the theft of personal property while traveling through the user's homeowner's policy, the umbrella travel insurance policy's coverage of theft of personal property can be reduced. As such, a discount may be provided to the user because the amount of coverage being provided through the umbrella travel insurance policy is being decreased. In umbrella travel insurance quote 300, the savings is $27 on theft of personal property coverage.

Line 325 represents coverage for legal fees. Legal fees may represent any costs associated with hiring a lawyer, bail bonds, arbitration, mediation, fines, and/or any other legal cost incurred while traveling. In umbrella travel insurance quote 300, no coverage is provided through any of the user's other specified insurance policies; therefore no additional savings is provided to the user. Line 330 represents coverage for court fees. Court fees may cover such expenses as costs associated with court appearances. Line 335 represents injury while traveling and may cover injuries sustained while the user is traveling. Similarly, line 340 covers sickness while traveling and may cover sicknesses contracted while the user is traveling. Line 345, evacuation, may apply after the user has been hospitalized for an amount of time (e.g., 5 days) and may provide transport (with medical assistance) back to the user's country of origin. Line 350, bedside visitor, may provide transport and/or lodging for a person to visit the user after the user has been hospitalized for an amount of time.

Lines 355 through 365 may relate to the operation of a vehicle in the countries listed in line 310. Line 355 lists coverage for vehicular damage while traveling. In this instance, the user has either full or partial coverage through his auto insurance policy, which may be held either by the insurance company issuing the umbrella travel insurance quote or by some third party insurance company. Based on the coverage provided by the user's automotive insurance, the user receives an amount of savings because less coverage is needed to be provided through the umbrella travel insurance policy. Line 360, vehicle theft, and line 365, vehicle collision, may also be either eliminated or reduced in cost due to coverage provided to the user through some other insurance policy the user holds, such as his automotive insurance. In the exemplary embodiment of FIG. 3, the discount is seven and twelve dollars, respectively.

Line 370 may provide coverage for kidnapping. For example, this may include the payment of ransom if the user is kidnapped and held hostage. In this instance, because none of the user's other insurance policies contain kidnapping insurance, the user is not provided with a savings amount for kidnapping insurance. Line 375 covers the theft of items acquired while traveling. For example, if the user purchases some souvenirs or clothing while traveling, and those items are subsequently stolen while the user is traveling, the cost of the items may be covered by the umbrella travel insurance. The user may be required to produce receipts for the items to reduce the likelihood of fraud. Similarly, line 380 may provide coverage for the loss of items acquired while traveling. For instance, if a bag filled with items purchased while traveling is lost by an airline, the items may be covered by the umbrella travel insurance policy. Again, the user may need to produce receipts for the items to reduce the likelihood of fraud.

Line 382 may represent coverage for items brought traveling. Example of items that a user may bring traveling includes cameras, watches, jewelry, and a smartphone. In umbrella travel insurance quote 300, the user has coverage for his camera through a VPP (valuable personal property) policy while traveling. As such, the user is provided with a discount based on at least some coverage already existing for the user.

Line 385 may reflect a total cost for a policy based on the umbrella travel insurance quote of FIG. 3 if the savings are ignored. Line 390 may represent an amount of a discount that is provided due to the user having some of the coverage being provided by other insurance policies held by the user. Line 395 may reflect the final cost of the umbrella travel insurance policy if coverage provided to the user through other insurance policies is factored in.

Exemplary embodiment of an umbrella travel insurance quote 300 includes the above mentioned coverage. It should be understood that more coverage or less coverage may be present in other embodiments. The examples of deductibles, countries, dates, coverage, whether coverage is provided through some other insurance policy, and savings is intended to merely be examples and are not intended to limit other embodiments. Umbrella travel insurance quote 300 may serve as a quote to provide a user. If the user agrees to the umbrella travel insurance quote (and pays for it), the quote may mature into an umbrella travel insurance policy.

Figure 4:
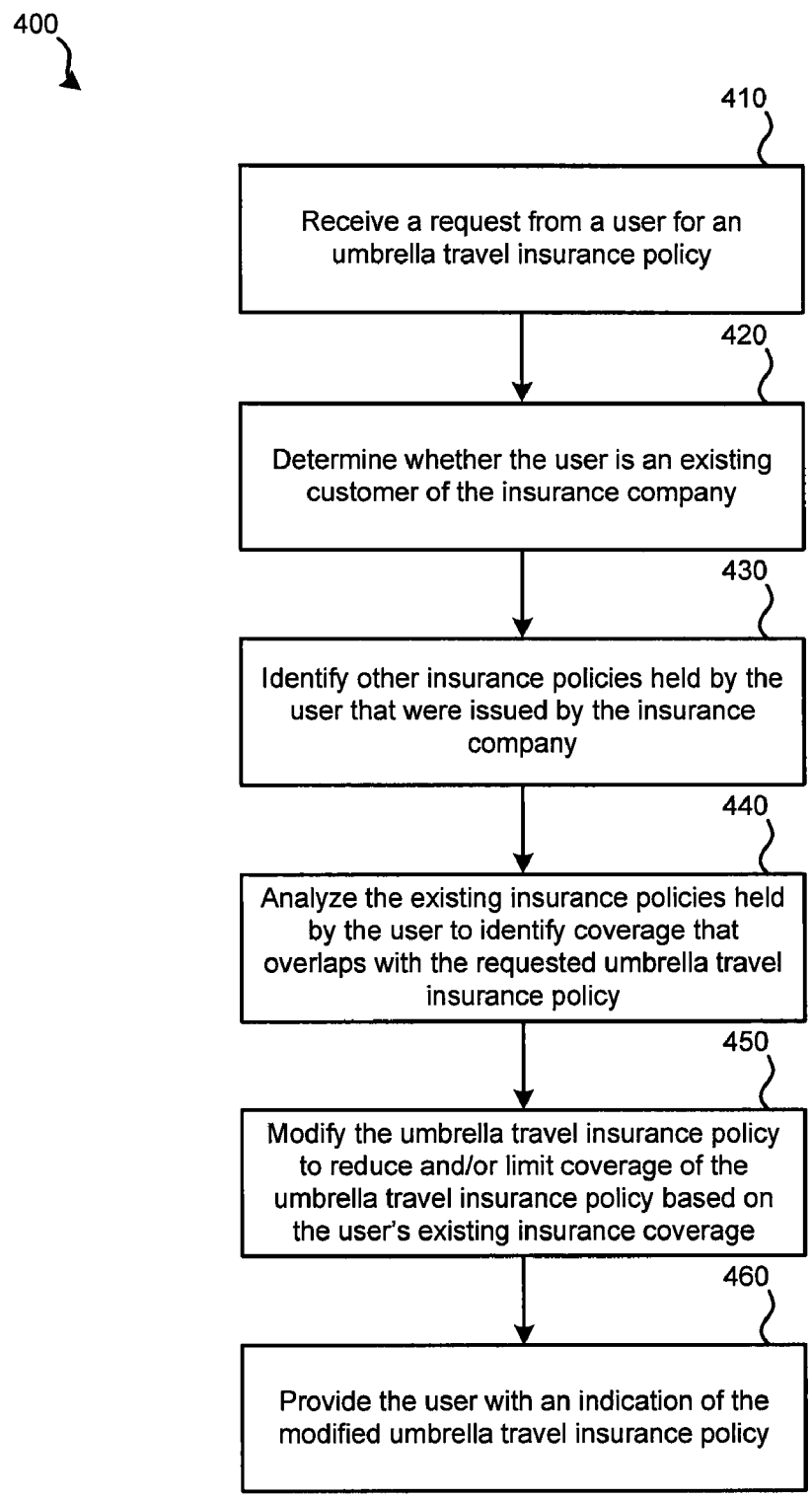
FIG. 4 illustrates a high level flowchart illustrating a method for issuing an umbrella travel insurance policy according to an embodiment of the present invention.

To create umbrella travel insurance quote 300 of FIG. 3, a method may be used. Such a method may use systems such as those detailed in FIGS. 1 and 2. FIG. 4 illustrates a high level flowchart illustrating a method for issuing an umbrella travel insurance policy according to an embodiment of the present invention. Method 400 may be performed using the systems of FIGS. 1 and 2, or may be performed using some other system.

At block 410, a request is received from a user for an umbrella travel insurance policy.

Such a request may be received via an interface, such as one of interfaces 260 of FIG. 2. For example, the user may send a request using a mobile device or a website. The request may or may not specify some information regarding the insurance coverage the user desires. For example, the request may specify dates and countries that the user intends on visiting. The request may also identify the coverage that the user desires. In some instances, the user may request a standard umbrella travel insurance policy, which may contain certain standard coverage areas with set deductibles. The user may or may not have the ability to modify the coverage and deductibles. The user may also supply various biographical information, such as his name, address, birthday, social security number, and/or account number with the insurance company (if the user has one).

At block 420, it is determined whether the user already has an account with the insurance company. This determination may be based on the biographical information supplied by the user and/or by an explicit question posed to the user, such as: "Are you currently a customer of the insurance company?" At block 430, if the user is a customer of the insurance company, the other insurance policies held by the user may be identified. As an example, a home owner's insurance policy and an automotive insurance policy issued by the insurance company may be identified.

At block 440, the insurance policies held by the user that were issued by the insurance company is analyzed. These insurance policies may be analyzed for overlap between the umbrella travel insurance policy requested by the user and coverage already existing for the user in his other identified insurance policies that would apply in the locations and the dates of his travel. Some of these other identified insurance policies may provide all of the coverage areas desired by the user. Therefore, the umbrella travel insurance policy would not need to provide any coverage to the user for these occurrences. In other instances, these other identified insurance policies may provide only some of the coverage desired by the user. Therefore, the umbrella travel insurance policy may be used to supplement the coverage of the user's other identified insurance policies. Because these other insurance policies provide partial coverage, the cost of the umbrella travel insurance policy may be reduced because the amount of coverage can be reduced.

At block 450, the coverage of the umbrella travel insurance policy is modified to account for the full and/or partial coverage provided by the user's other insurance policies. This may involve certain coverage areas being eliminated from the umbrella travel insurance policy. This may also involve certain coverage areas being reduced in the umbrella travel insurance policy. A reduction in a coverage area may involve increasing a deductible, raising the minimum amount of a claim necessary to submit a claim, and/or lowering the maximum amount that may be claimed through the umbrella travel insurance policy.

At block 460, the user is provided with an indication of the umbrella travel insurance policy. This umbrella travel insurance policy may be modified from the umbrella travel insurance policy initially requested by the customer based on the coverage provided through the user's other insurance policies. The indication of the umbrella travel insurance policy may be a quote. The user may be permitted to consent to the umbrella travel insurance policy quote, such as by providing payment, a signature, and/or some other response indicating consent, at which time the umbrella travel insurance policy quote may mature into umbrella travel insurance policy.

It should be appreciated that the specific steps illustrated in FIG. 4 provide a particular method of issuing an umbrella travel insurance policy or a quote for an umbrella travel insurance policy according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5A:
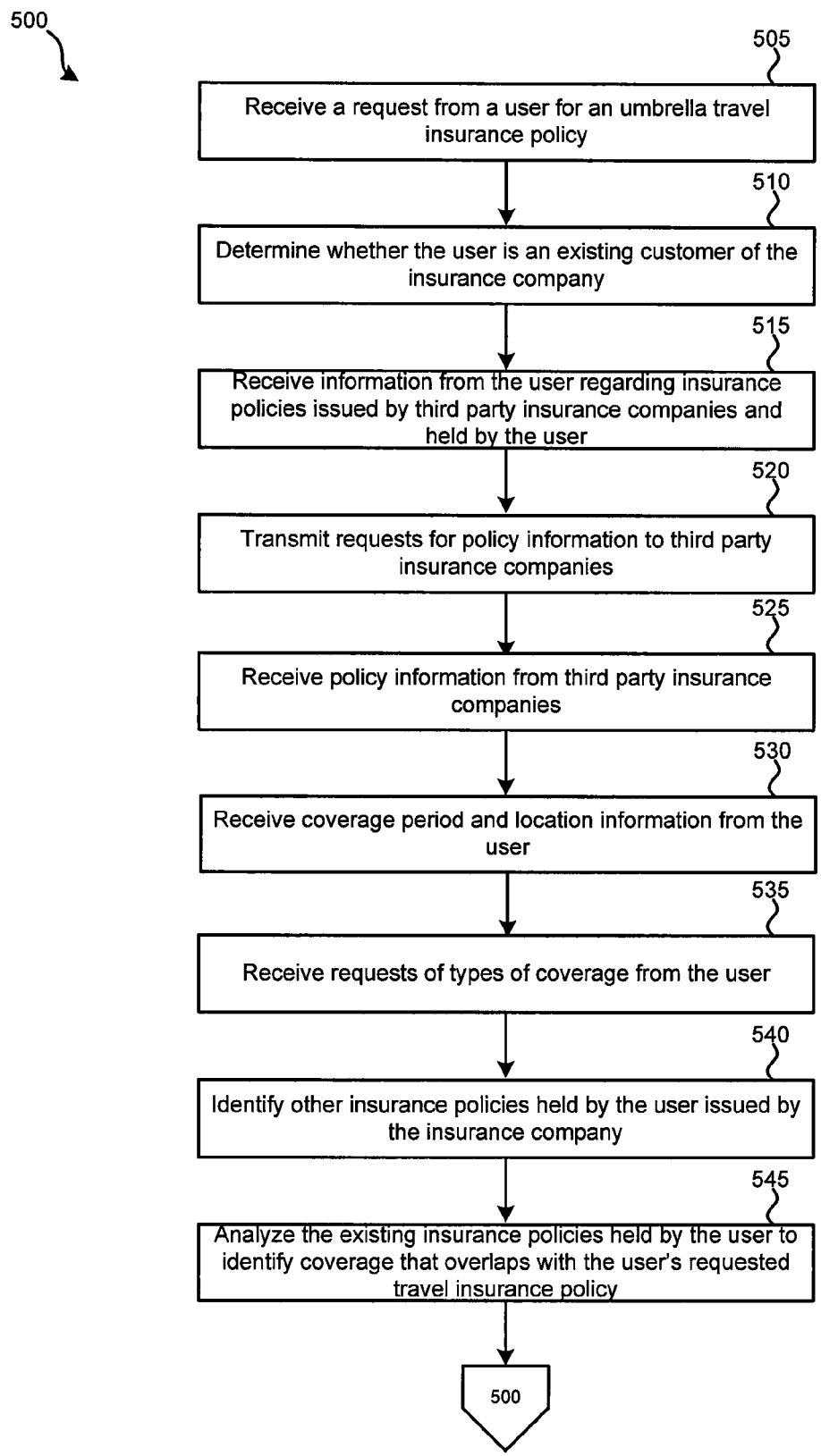
FIGS. 5A-B illustrate a high level flowchart illustrating a method for issuing an umbrella travel insurance policy according to an embodiment of the present invention.
Figure 5B:
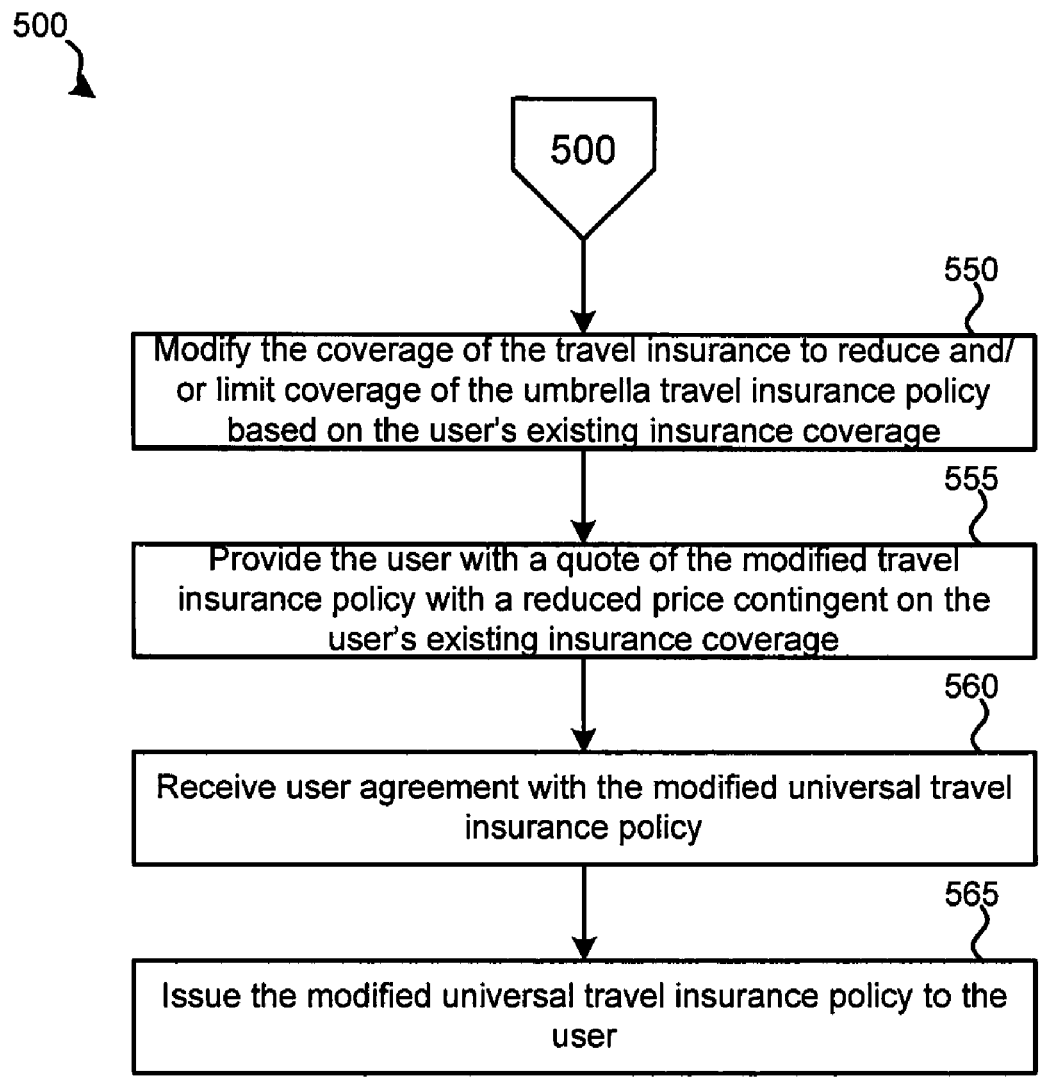

FIGS. 5A-B illustrate a high level flowchart illustrating a method for issuing an umbrella travel insurance policy according to an embodiment of the present invention. Method 500 may be performed using the systems of FIGS. 1 and 2, or may be performed using some other system. Method 500 may also be used to create an umbrella travel insurance quote, such as presented in FIG. 3.

At block 505, a request is received from a user for an umbrella travel insurance policy. Such a request may be received via an interface, such as one of interfaces 260 of FIG. 2. For example, the user may send a request using a mobile device or a website. The request may or may not specify some information regarding the insurance the user desires. For example, the request may specify dates of travel and countries that the user intends on visiting. The request may also identify the coverage that the user desires. In some instances, the user may request a standard umbrella travel insurance policy, which may contain certain standard coverage areas with set deductibles. The user may or may not have the ability to modify the coverage and deductibles. The user may also supply various biographical information, such as his name, address, birthday, Social Security number, and/or account number with the insurance company (if the user has one).

At block 510, a determination of whether the user is an existing customer of the insurance company is made. This determination may be based on the biographical information supplied by the user or by an explicit question to the user, such as: "Are you currently a customer of the insurance company?"

If the user does not have an insurance policy issued by the insurance company, or the user indicates that the user has one or more insurance policies issued by third party insurance companies, the user is requested to provide information regarding the third party insurance policies at block 515. At block 520, one or more third party insurance companies is contacted for information regarding the insurance policies held by the user. The third party insurance companies that are contacted may be determined using the information received at block 515 or a group of major insurance companies may be contacted for available insurance information for the user. At block 525, policy information is received from third party insurance companies. This policy information may specify coverage provided by insurance policies issued by the third party insurance company to the user. In some embodiments, as a supplement to, or in place of, contacting third party insurance companies, the user may provide details regarding coverage the user has through third party insurance.

At block 530, additional information is received from the user. The user may specify information such as the period of time and the countries where the user desires coverage. Other information may also be received from the user.

At block 535, the user requests various types of coverage. For example, the user may generally specify that the user does or does not desire vehicular coverage, medical coverage, theft coverage, etc. The user may also provide more specific requests for coverage. For example, the user may specify that the user desires evacuation coverage with a deductible of $500.

At block 540, insurance policies issued by the insurance company (that also received the request for the universal travel insurance policy) for the user are identified. As an example, a homeowner's insurance policy and an automotive insurance policy may be identified. At block 545, the user's existing insurance policies, whether held by the insurance company or a third party insurance company, are analyzed to identify coverage that overlaps with the user's requested umbrella travel insurance policy. Some of these other identified insurance policies may provide all of the coverage desired by the user. Therefore, the umbrella travel insurance policy would not need to provide any coverage to the user for these occurrences. In other instances, these other identified insurance policies may provide only some of the coverage desired by the user. Therefore, the umbrella travel insurance policy may be used to supplement the coverage of the user's other identified insurance policies. Because these other insurance policies provide partial coverage, the cost of the umbrella travel insurance policy may be reduced.

Continuing to block 550 on FIG. 5B, the coverage of the umbrella travel insurance policy is reduced, eliminated, and/or limited based on the user's existing insurance coverage provided through other insurance policies issued by the insurance company and/or third party insurance companies. This may involve certain coverage areas being eliminated from the umbrella travel insurance policy. This may also involve certain coverage areas being reduced in the umbrella travel insurance policy. A reduction in coverage may involve increasing the deductible, raising the minimum amount, and/or lowering the maximum amount that may be claimed through the umbrella travel insurance policy.

At block 555, the user is provided with a quote of the umbrella travel insurance policy that reflects discounts provided due to coverage that was already present in the user's other insurance policies. The quote for an umbrella travel insurance policy may appear similar to that presented in FIG. 3. This quote may be presented via an interface such as those described in relation to FIG. 2. At block 560, the user consents to the umbrella travel insurance quote by providing payment and/or providing a signature. Also, consent may occur via one of the interfaces discussed in FIG. 2. At block 565, the umbrella travel insurance policy that has been modified to account for coverage provided to the user through other insurance policies is issued to the user.

It should be appreciated that the specific steps illustrated in FIGS. 5A and 5B provide a particular method of issuing an umbrella travel insurance policy or a quote for an umbrella travel insurance policy according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
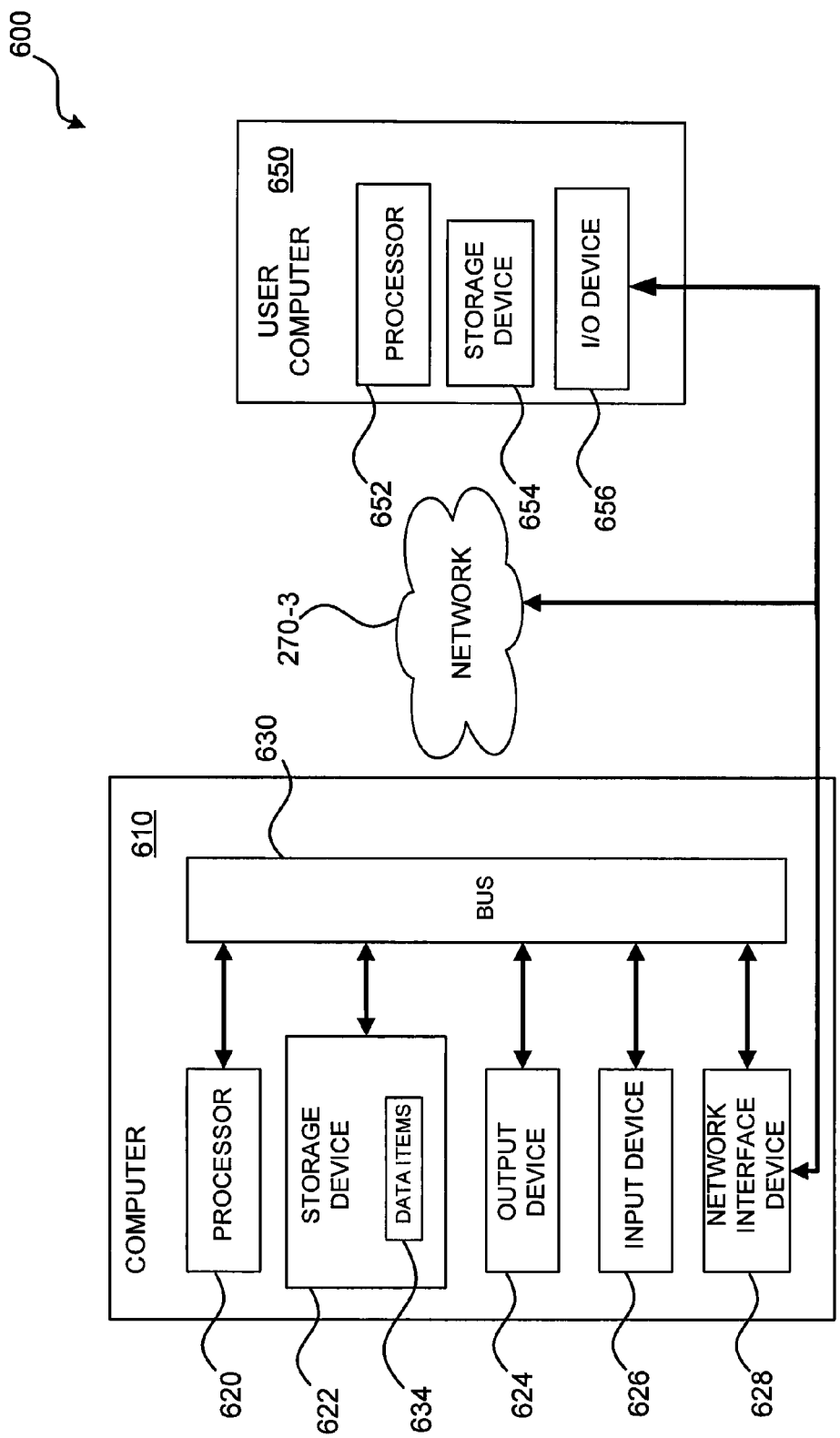
FIG. 6 illustrates a high level schematic diagram of a computer system including instructions to perform any one or more of the methodologies described herein.

FIG. 6 shows a block diagram of a computer including instructions to perform any one or more of the methodologies described herein. A system 600 includes a computer 610 connected to a network 270-3, which may represent the same or a different network from networks 270-1 and 270-2 of FIG. 2. Computer 610 may represent at least part of insurance processing system 110 of FIG. 1. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 270-3 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 270-3.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 270-3 through any suitable communications protocol. The network interface device 628 sends and receives data items from the network 270-3.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 270-3 may be any suitable network and may support any appropriate protocol suitable for communication to the computer 610. In an embodiment, the network 270-3 may support wireless communications. In another embodiment, the network 270-3 may support hard-wired communications, such as a telephone line or cable. In another embodiment, the network 270-3 may support the Ethernet IEEE (Institute of Electrical and Electronics Engineers) 802.3x specification. In another embodiment, the network 270-3 may be the Internet and may support IP (Internet Protocol). In another embodiment, the network 270-3 may be a local area network (LAN) or a wide area network (WAN). In another embodiment, the network 270-3 may be a hotspot service provider network. In another embodiment, the network 270-3 may be an intranet. In another embodiment, the network 270-3 may be a GPRS (General Packet Radio Service) network. In another embodiment, the network 270-3 may be any appropriate cellular data network or cell-based radio network technology. In another embodiment, the network 270-3 may be an IEEE 802.11 wireless network. In still another embodiment, the network 270-3 may be any suitable network or combination of networks. Although one network 270-3 is shown, in other embodiments any number of networks (of the same or different types) may be present.

A user computer 650 can interact with computer 610 through network 270-3. The user computer 650 includes a processor 652, a storage device 654, and an input/output device 656.

The description related to processor 620 and storage device 622 is applicable to processor 652 and storage device 654. As an example, the user computer 650 can be a personal computer, laptop computer, or the like, operated by a member of a membership organization (e.g., the present assignee). Using the user computer 650, the member can then interact with computer 610 operated by the present assignee through network 270-3 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention.

Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, the preceding description details modifying an umbrella travel insurance policy. It should be understood that similar systems and methods may be used to provide other forms of modified insurance policies, such as homeowner's insurance, automotive insurance, renter's insurance, valuable personal property insurance, fire insurance, flood insurance, etc.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing travel insurance to an existing customer, the method comprising:
   providing a computer system;
   receiving, by the computer system, a request from the existing customer for a travel insurance policy having a set of initial coverage areas, wherein the computer system is operated on behalf of an insurance company;
   determining, by the computer system, that the existing customer has an existing insurance policy issued by the insurance company;
   analyzing, by the computer system, the existing insurance policy to determine a set of existing coverage areas associated with the existing insurance policy;

determining, by the computer system, that an overlap is present between the set of initial coverage areas associated with the travel insurance policy and the set of existing coverage areas associated with the existing insurance policy;

modifying, by the computer system, based on the determined overlap between the set of initial coverage areas and the set of existing coverage areas, one or more of the initial coverage areas in the set of initial coverage areas associated with the travel insurance policy to create a modified travel insurance policy; and providing, by the computer system, information associated with the modified travel insurance policy to the existing customer.

2. The method of claim 1, wherein modifying the one or more of the initial coverage areas comprises removing at least one of the one or more of the initial coverage areas.

3. The method of claim 1, wherein the existing insurance policy is a homeowners insurance policy.

4. The method of claim 1, wherein:

providing the indication of the modified travel insurance policy to the existing customer comprises providing the existing customer with a quote of a price for the modified travel insurance policy;

the price of the modified travel insurance policy is less than a price for the travel insurance policy; and the price of the modified travel insurance policy is at least partially dependent on the existing insurance policy.

5. The method of claim 1, wherein modifying coverage of the travel insurance policy using coverage of the existing insurance policy comprises reducing coverage of at least one coverage area of the travel insurance policy to create the modified travel insurance policy.

6. The method of claim 1, further comprising:

determining, by the computer system, that the existing customer has a second existing insurance policy issued by the insurance company;

analyzing, by the computer system, the second existing insurance policy issued by the insurance company held by the existing customer; and modifying, by the computer system, coverage of the modified travel insurance policy using coverage of the second existing insurance policy.

7. The method of claim 1, wherein coverage areas of the travel insurance policy comprise:

theft of personal property;
treatment for injuries sustained while traveling;
legal and court fees; and
liability costs.

8. The method of claim 1, wherein coverage area of the travel insurance policy comprise at least one of theft or loss of one or more items acquired while traveling.

9. The method of claim 1, further comprising receiving, by the computer system, an indication of a start date and an end date of the travel insurance policy requested by the existing customer.

10. A non-transitory computer-readable storage medium comprising a plurality of computer-readable instructions tangibly embodied on the computer-readable storage medium, which, when executed by a data processor, provide travel insurance to an existing customer, the plurality of instructions comprising:

instructions that cause the data processor to receive a request from the existing customer for a travel insurance policy having a set of initial coverage areas, wherein the computer system is operated on behalf of an insurance company;

instructions that cause the data processor to determine that the existing customer has an existing insurance policy issued by the insurance company;

instructions that cause the data processor to analyze the existing insurance policy to determine a set of existing coverage areas associated with the existing insurance policy;

instructions that cause the data processor to determine that an overlap is present between the set of initial coverage areas associated with the travel insurance policy and the set of existing coverage areas associated with the existing insurance policy;

instructions that cause the data processor to modify, based on the determined overlap between the set of initial coverage areas and the set of existing coverage areas, one or more of the initial coverage areas in the set of initial coverage areas associated with the travel insurance policy to create a modified travel insurance policy; and instructions that cause the data processor to provide information associated with the modified travel insurance policy to the existing customer.

11. The non-transitory computer-readable storage medium of claim 10, wherein instructions that cause the data processor to modify the one or more of the initial coverage areas comprises removing at least one of the one or more of the initial coverage areas.

12. The non-transitory computer-readable storage medium of claim 10, wherein:

instructions that cause the data processor to provide the indication of the modified travel insurance policy to the customer comprises providing the existing customer with a quote for a price of the modified travel insurance policy; and the price of the modified travel insurance policy is less than a price for the travel insurance policy.

13. The non-transitory computer-readable storage medium of claim 10, wherein instructions that cause the data processor to modify coverage of the travel insurance policy using coverage of the existing insurance policy comprises reducing coverage of at least one coverage area of the travel insurance policy to create the modified travel insurance policy.

14. The non-transitory computer-readable storage medium of claim 10, wherein the instructions further comprise instructions for:

instructions that cause the data processor to determine the existing customer has a second existing insurance policy issued by the insurance company;

instructions that cause the data processor to analyze the second existing insurance policy issued by the insurance company held by the existing customer; and instructions that cause the data processor to modify coverage of the modified travel insurance policy using coverage of the second existing insurance policy.

15. The non-transitory computer-readable storage medium of claim 10, wherein coverage of the travel insurance policy comprises:

theft of personal property;
treatment for injury sustained while traveling;
legal and court fees; and
liability costs.

16. The non-transitory computer-readable storage medium of claim 10, wherein the instructions further comprise instructions that cause the data processor to receive an indication of a start date and an end date of the travel insurance policy requested by the existing customer.

17. A system for providing travel insurance to an existing customer having homeowners insurance held by an insurance company, the system comprising:
- a processor; and
- a memory communicatively coupled with and readable by the processor and having stored therein processor-readable instructions which, when executed by the processor, cause the processor to:
- receive a request from the existing customer for a travel insurance policy having a set of initial coverage areas, wherein the computer system is operated on behalf of an insurance company;
- determine that the existing customer has an existing insurance policy issued by the insurance company;
- analyze the existing insurance policy to determine a set of existing coverage areas associated with the existing insurance policy;
- determine that an overlap is present between the set of initial coverage areas associated with the travel insurance policy and the set of existing coverage areas associated with the existing insurance policy;
- modify, based on the determined overlap between the set of initial coverage areas and the set of existing coverage areas, one or more of the initial coverage areas in the set of initial coverage areas associated with the travel insurance policy to create a modified travel insurance policy; and
- provide information associated with the modified travel insurance policy to the existing customer.

18. The system of claim 17, wherein the processor-readable instructions, which when executed by the processor, further cause the processor to: remove at least one coverage area from the travel insurance policy to create the modified travel insurance policy.

19. The system of claim 17, wherein:
the information associated with the modified travel insurance policy provided to the existing customer comprises:
- a quote for a price of the modified travel insurance policy, wherein
  the price of the modified travel insurance policy is less than a price for the travel insurance policy.

20. The system of claim 17, wherein the processor-readable instructions, which when executed by the processor, further cause the processor to: reduce coverage of at least one coverage area of the travel insurance policy to create the modified travel insurance policy.

* * * * *